US011453805B2

(12) United States Patent
Dash et al.

(10) Patent No.: US 11,453,805 B2
(45) Date of Patent: *Sep. 27, 2022

(54) SILICONE RELEASE COATING COMPOSITIONS

(71) Applicant: DOW SILICONES CORPORATION, Midland, MI (US)

(72) Inventors: Aswini K. Dash, Midland, MI (US); Zhenbin Niu, Midland, MI (US); David A. Rich, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/494,298

(22) PCT Filed: Mar. 16, 2018

(86) PCT No.: PCT/US2018/022821
§ 371 (c)(1),
(2) Date: Sep. 15, 2019

(87) PCT Pub. No.: WO2018/170372
PCT Pub. Date: Sep. 20, 2018

(65) Prior Publication Data
US 2020/0010734 A1    Jan. 9, 2020

Related U.S. Application Data

(60) Provisional application No. 62/472,534, filed on Mar. 16, 2017.

(51) Int. Cl.
C09J 7/40 (2018.01)
C09J 11/06 (2006.01)

(52) U.S. Cl.
CPC ............... C09J 7/401 (2018.01); C09J 11/06 (2013.01); C09J 2483/005 (2013.01)

(58) Field of Classification Search
CPC ....... C09J 7/401; C09J 11/06; C09J 2483/005
See application file for complete search history.

(56) References Cited

U.S. PATENT DOCUMENTS

| 4,504,645 | A | 3/1985 | Melancon |
| 4,526,953 | A | 7/1985 | Dallavia, Jr. |
| 4,530,989 | A | 7/1985 | Michel et al. |
| 4,609,574 | A | 9/1986 | Keryk et al. |
| 5,432,006 | A | 7/1995 | Kessel et al. |
| 6,806,339 | B2 | 10/2004 | Cray et al. |
| 7,238,755 | B2 | 7/2007 | Herzig et al. |
| 2002/0061998 | A1 | 5/2002 | Cray et al. |
| 2005/0049350 | A1 | 3/2005 | Tonapi et al. |
| 2005/0049357 | A1 | 3/2005 | Zhong et al. |
| 2005/0148721 | A1 | 7/2005 | Tonapi et al. |
| 2007/0098660 | A1 | 5/2007 | Taneri et al. |
| 2007/0289495 | A1 | 12/2007 | Corporaton |
| 2010/0255205 | A1 | 10/2010 | Cray et al. |
| 2010/0266856 | A1 | 10/2010 | White et al. |
| 2011/0015336 | A1 | 1/2011 | Koellnberger |
| 2014/0004359 | A1 | 1/2014 | Marrot et al. |
| 2014/0010963 | A1 | 1/2014 | Brasseur et al. |

(Continued)

FOREIGN PATENT DOCUMENTS

| CN | 1871305 A | 11/2006 |
| CN | 101061193 A | 10/2007 |
| CN | 101061993 A | 10/2007 |

(Continued)

OTHER PUBLICATIONS

International Search Report for PCT/US2018/022821 dated May 28, 2018, 5 pages.
Machine assisted English translation of CN101062970A obtained from https://patents.google.com/patent on Feb. 2, 2021, 9 pages.
DAS Registry No. 541-59-3 SciFinder American Chemical Society (ACS), 2021, p. 2.
International Search Report for PCT/US2018/022818 dated May 17, 2018, 5 pages.

(Continued)

Primary Examiner — Robert S Walters, Jr.
(74) Attorney, Agent, or Firm — Warner Norcross & Judd LLP

(57) ABSTRACT

A curable polysiloxane release coating composition comprises (A) an organopolysiloxane containing at least two (2) ethylenically unsaturated groups, (B) an organopolysiloxane containing at least 2 Si—H groups per molecule, and (C) a hydrosilylation catalyst. If the organopolysiloxane (A) contains only 2 ethylenically unsaturated groups, the organopolysiloxane (B) contains on average more than 2 Si—H groups per molecule. The composition further comprises (D1) a hydrosilylation inhibitor comprising a maleimide of the general formula (I). In formula (I), A3? represents a hydrogen atom or a hydrocarbyl or substituted hydrocarbyl group having 1 to 18 carbon atoms, and A1? and A2? each represent a hydrogen atom or a hydrocarbyl or substituted hydrocarbyl group having 1 to 18 carbon atoms. The composition yet further comprises (D2) a second hydrosilylation inhibitor selected from acetylenic compounds, ethylenically unsaturated isocyanates, acetylenically unsaturated silanes and unsaturated dicarboxylic acid diesters or a maleate compound or a mixture thereof.

16 Claims, No Drawings

(56) References Cited

U.S. PATENT DOCUMENTS

| | | |
|---|---|---|
| 2014/0329099 A1 | 11/2014 | Marrot et al. |
| 2015/0158982 A1 | 6/2015 | Saito et al. |
| 2020/0325371 A1 | 10/2020 | Corp |

FOREIGN PATENT DOCUMENTS

| | | |
|---|---|---|
| CN | 101062970 A | 10/2007 |
| CN | 103429685 A | 12/2013 |
| CN | 105860082 A | 8/2016 |
| EP | 0764703 A2 | 3/1997 |
| EP | 1526150 A1 | 4/2005 |
| JP | 559206464 A | 11/1984 |
| JP | S60123568 A | 7/1985 |
| JP | H05156167 A | 6/1993 |
| JP | 2001064390 A | 3/2001 |
| JP | 2004315693 A | 11/2004 |
| JP | 2009538950 A | 11/2009 |
| JP | 2011021189 A | 2/2011 |
| JP | 2014028954 A | 2/2014 |
| JP | 2014507501 A | 3/2014 |
| JP | 2014523938 A | 9/2014 |
| JP | 2016023288 A | 2/2016 |
| WO | 3210298 A1 | 2/2002 |
| WO | 033050174 A1 | 6/2003 |
| WO | 2004046267 A2 | 6/2004 |
| WO | 2006055233 A1 | 5/2006 |

OTHER PUBLICATIONS

Machine assisted English translation of JP2016023288A obtained from https://patents.google.com/patent on Dec. 14, 2021, 18 pages.
Machine assisted English translation of JP2004315693A obtained from https://patents.google.com/patent on Dec. 14, 2021, 8 pages.
Machine assisted English translation of CN105860082A obtained from https://patents.google.com/patent on Dec. 14, 2021, 14 pages.

SILICONE RELEASE COATING COMPOSITIONS

This application is the National Stage of International Appl. No. PCT/US2018/022821 filed on 16 Mar. 2018, which claims priority to and all advantages of U.S. Provisional Pat. Appl. No. 62/472,534 filed on 16 Mar. 2017, the content of which is hereby incorporated by reference in its entirety.

This disclosure relates to polysiloxane release coatings. Single sided liners, e.g., backing sheets for pressure sensitive adhesive labels, are usually adapted to temporarily retain the labels without affecting the adhesive properties of the labels. Double sided liners, e.g., interleaving sheets for double sided and transfer tapes, are utilized to ensure the protection and desired unwind characteristics of a double sided self-adhesive tape or adhesive film.

A substrate, e.g. a single sided liner, is coated by applying a polysiloxane based release coating composition from a source, e.g. a bath of the release coating composition onto the substrate and subsequently curing the composition, by, e.g. thermally initiated hydrosilylation. The release coating is required to adhere well to the liner while having relatively low adhesion to the adhesive so that the label can be removed from the liner by a predetermined peel force and then applied and permanently adhered to an appropriate substrate.

The substrates for both single and double sided liners have traditionally been paper, and the temperature at which the polysiloxane based release coating is cured is usually at least 130° C. Increasingly, the packaging industry wishes to use alternative substrates including thermally sensitive substrates such as low density polyethylene (LDPE), high density polyethylene (HDPE), polypropylene (PP), biaxially oriented polypropylene (BOPP), polyethylene coated Kraft paper (PEK) and temperature sensitive papers.

The required curing temperature for the polysiloxane based release coating on such thermally sensitive substrates is low, for example in the range 70° C. to 90° C., e.g. 85° C. It is desirable for polysiloxane release coating compositions to be capable of curing in an acceptable time at such temperatures, while being stable at ambient temperature to avoid premature curing during storage and transport.

A polysiloxane compound contains several Si—O—Si— bonds forming a polymeric chain, where the repeating unit contains —(Si—O)—. An organopolysiloxane, sometimes called a silicone, contains repeating —(Si—O)— units where at least one silicon atom bears at least one organic group i.e. containing at least one carbon atom. A polysiloxane comprises terminal groups and pendant groups. A terminal group is a chemical group located on a silicon atom which is at an end of the polymer chain. A pendant group is a group located on a silicon atom which silicon atom is not at the end of the polymeric chain.

A polysiloxane may comprise at least one of the following units: M unit (mono-functional), D unit (di-functional), T unit (tri-functional), Q unit (tetra-functional). M units typically have the formula $R^1R^2R^3SiO_{1/2}$. D units typically have the formula $R^2R^3SiO_{2/2}$. T units typically have the formula $R^4SiO_{3/2}$. Q units typically have the formula $SiO_{4/2}$. $R^1$, $R^2$, $R^3$, and $R^4$ are each a substituent, typically an organic substituent. Each substituent $R^1$, $R^2$, $R^3$, and $R^4$ can be selected for example from alkyl, aryl, alkenyl, acrylate, methacrylate and others. For example an unsaturated group may be alkynyl or alkenyl group, e.g. a vinyl group or a hexenyl group.

A linear polysiloxane typically contains only D units and terminal M units. A branched polysiloxane which may be a resin typically contains at least one T unit and/or at least one Q unit. Resins are 3 dimensional structures containing a plurality of T and/or Q units, for example, an MQ resin is an organopolysiloxane containing a plurality of interlinked Q units and terminal M units.

Hydrosilylation is an addition reaction where a compound containing at least one unsaturated group reacts with a compound containing at least one Si—H group. An unsaturated group which may alternatively be called an ethylenically unsaturated group is a group comprising a double or triple liaison between two atoms. The bonded atoms may be carbon atoms or carbon-heteroatom. For example an unsaturated group may be alkynyl or alkenyl e.g. a vinyl or hexenyl group. A hydrocarbyl group is a univalent radical derived from a hydrocarbon, such as alkyl, cycloalkyl or aryl.

A polysiloxane based release coating composition generally comprises a polysiloxane containing alkenyl groups, an organohydrogenpolysiloxane cross-linking agent and a hydrosilylation catalyst effective to catalyse the reaction between the alkenyl groups and the Si—H groups. The release coating composition usually requires an inhibitor to prevent the cure of the coating composition from occurring below a predetermined temperature. Whilst an inhibitor is not essential to the functioning of the coating composition itself, in the absence of an inhibitor the catalyst may initiate/catalyse the cure of the silicone based release coating composition at ambient temperature, once the three above constituents have been mixed together.

U.S. Pat. No. 6,806,339 describes a release coating composition comprising a branched polysiloxane containing alkenyl or alkynyl units, an organohydrogenpolysiloxane cross-linking agent in an amount such that the ratio of the total number of Si—H groups in the composition to aliphatically unsaturated hydrocarbon groups in the composition is from 0.9:1 to 3:1, and a hydrosilylation catalyst effective to catalyse the reaction between the branched siloxane and the cross-linking agent. The branched siloxane consists of one or more Q units of the formula $(SiO_{4/2})$, 15 to 995 D units of the formula $R^b_2SiO_{2/2}$, and M units of the formula $R^aR^b_2SiO_{1/2}$, wherein each $R^a$ substituent is an alkyl, alkenyl or alkynyl group having from 1 to 6 carbon atoms, at least three $R^a$ substituents in the branched siloxane being alkenyl or alkynyl units, and each $R^b$ substituent is selected from the group consisting of an alkyl group having from 1 to 6 carbon atoms, an alkenyl group having 2 to 6 carbon atoms, an aryl group, an alkoxy group, an acrylate group and a methacrylate group.

U.S. Pat. No. 4,530,989 describes room temperature stable organopolysiloxane compositions containing organosilicon compounds having Si-bonded atoms and aliphatic multiple bonds, a platinum catalyst, and an inhibitor which is a maleinimide or a maleic acid derivative of the formula $R^1$—C(O)—CH=CH—C(O)—$R^2$, where $R^1$ is a hydroxyl or trimethylsiloxy group and $R^2$ is a hydrocarbonoxy radical.

U.S. Pat. No. 7,238,755 describes crosslinkable silicone coating compositions comprising organosilicon compounds having radicals containing aliphatic carbon-carbon multiple bonds, organosilicon compounds containing Si-bonded hydrogen atoms, catalysts which promote the addition of Si-bonded hydrogen onto aliphatic multiple bond, and optionally inhibitors, and an anti-misting additive which is a liquid branched polysiloxane containing alkenyl groups formed by reaction of α,ω-dialkenylsiloxane polymers with organosilicon compounds containing at least 3 Si-bonded hydrogen atoms per molecule.

U.S. Pat. No. 4,609,574 describes a curable release coating composition comprising an olefinic polydiorganosiloxane, a metal hydrosilylation catalyst, a methylhydrogenpolysiloxane, and an inhibitor for the hydrosilylation catalyst. The olefinic polydiorganopolysiloxane is made up of diorganosiloxane units and chain terminating units. It contains unsaturated radicals containing higher alkenyl radical containing at least 6 carbon atoms.

WO 03/050174 describes polyaddition-curable polyorganosiloxane compositions including a mixture based on a platinum group metal catalyst, an inhibitor of platinum group metal catalysts, and a pyridylamine ligand.

BRIEF SUMMARY OF THE INVENTION

There is provided herein, according to a first aspect of this disclosure, a curable polysiloxane release coating composition ("composition"). The composition comprises (A) an organopolysiloxane containing at least two (2) ethylenically unsaturated groups. The composition further comprises (B) an organopolysiloxane containing at least 2 Si—H groups per molecule. If component (A) contains only 2 ethylenically unsaturated groups, component (B) contains on average more than 2 Si—H groups per molecule. The composition further comprises (C) a hydrosilylation catalyst. Component (C) comprises a platinum group metal or a complex or compound of a platinum group metal. The composition further comprises (D1) a hydrosilylation inhibitor. Component (D1) comprises a maleimide of the general formula (I):

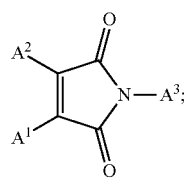

wherein $A^3$ represents a hydrogen atom or a hydrocarbyl or substituted hydrocarbyl group having 1 to 18 carbon atoms, and $A^1$ and $A^2$ each represent a hydrogen atom or a hydrocarbyl or substituted hydrocarbyl group having 1 to 18 carbon atoms. The composition yet further comprises (D2) a second hydrosilylation inhibitor. Component (D2) is selected from acetylenic compounds, ethylenically unsaturated isocyanates, acetylenically unsaturated silanes and unsaturated dicarboxylic acid diesters or a maleate compound or a mixture thereof.

Also provided herein, according to second aspect of this disclosure, is a process of applying a polysiloxane release coating on the surface of a substrate. Further provided herein, according to a third aspect of this disclosure, is use of the hydrosilylation inhibitors (D1) and (D2) in a curable polysiloxane release coating composition.

DETAILED DESCRIPTION OF THE INVENTION

The curable polysiloxane release coating composition ("composition") of this disclosure comprises components (A), (B), (C), (D1), and (D2). Optionally, the composition may further comprise one or more additional components.

Component (A) is an organopolysiloxane containing at least two (2) ethylenically unsaturated groups per molecule.

In certain embodiments, component (A contains at least three (3) ethylenically unsaturated groups per molecule; although, organopolysiloxanes (A) containing only 2 ethylenically unsaturated groups per molecule can be used successfully with an organopolysiloxane (B) containing on average more than 2 Si—H groups per molecule.

In various embodiments, component (A) is a branched organopolysiloxane comprising at least 3 organopolysiloxane chains each of which contains any suitable ethylenically unsaturated group.

Each ethylenically unsaturated group in the organopolysiloxane (A) may be the same or different. Examples of suitable ethylenically unsaturated groups may be, e.g. selected from vinyl, allyl, butenyl, pentenyl and hexenyl groups, but also can be longer chain alkenyl groups, e.g., 5-hexenyl, 6-heptenyl, 7-octenyl, 8-nonenyl, 9-decenyl or 10-undecenyl. In various embodiments, the alkenyl group may be branched. In certain embodiments, each ethylenically unsaturated group of component (A) is selected from vinyl and hexenyl groups. Polymers containing different ethylenically unsaturated groups, e.g. having vinyl and hexenyl groups on the same polymer, can be used, as can mixtures of polymers, e.g. a mixture of vinyl-functional and hexenyl-functional polymers.

The ethylenically unsaturated groups may be present as about 0.2 to about 5.0 weight (wt.)%, optionally from about 0.5 to about 4.0 wt. %, optionally from about 0.8 to about 4.0 wt. %, optionally from about 1.1 to about 4.0 wt. %, optionally from about 0.5 to about 1.8 wt. %, optionally from about 0.8 to about 1.8 wt. %, or optionally from about 1.1 to about 1.8 wt. %, of the silicon-bonded organic groups of the organopolysiloxane (A). This weight percent is calculated on basis of the weight of the alkenyl units compared to the total weight of the organopolysiloxane (A).

In various embodiments, the organopolysiloxane (A) comprises, or is, a linear organopolysiloxane containing at least 2, optionally at least 3, ethylenically unsaturated groups per molecule. Such a linear organopolysiloxane can contain alkenylmethylsiloxane ("D") units and/or alkenyldimethylsiloxane ("M") units, for example an alkenyldimethylsiloxane end-blocked copolymer of dimethylsiloxane units and alkenylmethylsiloxane units.

The linear organopolysiloxane (A) may have a viscosity of not less than about 50 mPa·s and not more than about 10000 mPa·s at 25° C. Viscosity can be determined by using a Brookfield DV-II viscometer using the appropriate spindle. In various embodiments, such as in solventless compositions, the linear organopolysiloxane (A) has a viscosity of from about 50 to about 1000 mPa·s at 25° C. In such embodiments, the number of siloxane units in the linear organopolysiloxane (A) (the degree of polymerization "DP") can be from about 20 to about 1000, or optionally from about 20 up to about 250 or about 500.

In other embodiments, such as in solvent-based compositions, the linear organopolysiloxane (A) has a viscosity higher than 10000 mPa·s at 25° C. In such embodiments, component (A) can be a high molecular weight compound. For example, the DP can be significantly higher than about 1000, optionally higher than about 2000, optionally higher than about 3000, or optionally higher than about 4000. Such organopolysiloxanes (A) can be so viscous only their viscosities in solution are measurable.

In alternate or further embodiments, component (A) comprises, or is, a branched organopolysiloxane containing at least 3 organopolysiloxane branch chains with at least 2 of the organopolysiloxane branch chains containing an ethylenically unsaturated group. In further embodiments, component (A) is a branched organopolysiloxane comprising at least 3 organopolysiloxane branch chains each of which contains an ethylenically unsaturated group.

Examples of suitable branched organopolysiloxanes (A) are terminated by units of the formula $R^aR^b{}_2SiO_{1/2}$ (M units) and comprise one or more units of the formula $SiO_{4/2}$ (Q units) or of the formula $R^cSiO_{3/2}$ (T units) and 15 to 995 units of the formula $R^b{}_2SiO_{2/2}$ (D units). Each $R^a$ substituent is selected from an alkyl group having 1 to 6 carbon atoms and an ethylenically unsaturated alkenyl group having 2 to 6 carbon atoms, with at least 3 $R^a$ substituents in the branched organopolysiloxane being ethylenically unsaturated alkenyl groups. Each $R^b$ substituent is an alkyl group having 1 to 6 carbon atoms or an aryl group. Each $R^c$ substituent is selected from an alkyl group having 1 to 6 carbon atoms, an ethylenically unsaturated alkenyl group having 2 to 6 carbon atoms, an aryl group or an alkoxy group having 1 to 6 carbon atoms.

In various embodiments, at least about 50%, optionally at least about 75%, optionally at least about 90%, or optionally substantially all, of the $R^a$ substituents are ethylenically unsaturated alkenyl groups. Each $R^b$ substituent can be, e.g., an alkyl group, such as a methyl, an ethyl, a propyl, an isopropyl, a butyl, a pentyl, or a hexyl, group. In certain embodiments, each $R^b$ substituent is selected from methyl and ethyl groups. In further embodiments, each $R^b$ substituent is a methyl group.

In various embodiments, branched organopolysiloxane (A) contains at least 2, optionally at least 3, polydiorganosiloxane chains of the formula $(R^b{}_2SiO_{2/2})_n$ wherein each n is independently from 2 to 100. In certain embodiments, component (A) is branched and comprises one or more "central" Q units of the formula $(SiO_{4/2})$. In further embodiments, four (4) branched chains extend from the central Q unit. In certain embodiments, component (A) may consist mainly of organopolysiloxane molecules of the general formula:

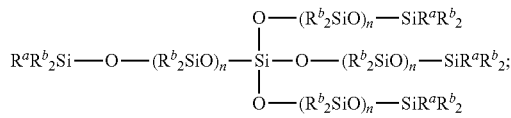

wherein each n is independently from 1 to 100. The preparation of branched organopolysiloxanes (A) comprising one or more core units of the formula $(SiO_{4/2})$ is described in U.S. Pat. No. 6,806,339, which is incorporated by reference in its entirety.

Branched organopolysiloxanes (A) comprising one or more units of the formula $R^cSiO_{3/2}$ and 15 to 995 units of the formula $R^b{}_2SiO_{2/2}$ can be prepared by mixing a compound having the general formula $(R^cSiO_{3/2})(R^aR^b{}_2SiO_{1/2})_3$ with a cyclic polydiorganosiloxane and/or a substantially linear hydroxyl terminated polydiorganosiloxane, and causing the mixture to react in the presence of an acid or phosphazene base catalyst at a temperature of up to about 180° C.

In various embodiments, at least about 50%, optionally at least about 75%, optionally at least about 90%, or optionally substantially all, of the $R^a$ substituents are ethylenically unsaturated alkenyl groups. Each $R^b$ substituent can be, e.g., an alkyl group, such as a methyl, an ethyl, a propyl, an isopropyl, a butyl, a pentyl, or a hexyl, group. In certain embodiments, each $R^b$ substituent is selected from methyl and ethyl groups. In further embodiments, each $R^b$ substituent is a methyl group.

Organopolysiloxanes (A) containing at least 2 hexenyl groups are effective in release coatings which cure at lower temperatures (such as, e.g., from about 70° C. to about 90° C.) both as linear organopolysiloxanes and as branched organopolysiloxanes. It is thought that branched organopolysiloxanes containing hexenyl groups are the most effective, for example branched organopolysiloxanes (A) terminated by units of the formula $R^aR^b{}_2SiO_{1/2}$ and comprising one or more units of the formula $SiO_{4/2}$ or of the formula $R^cSiO_{3/2}$ and 15 to 995 units of the formula $R^b{}_2SiO_{2/2}$ as described above, in which all or most of the $R^a$ substituents are hexenyl groups. Polymers containing different ethylenically unsaturated groups, for example having vinyl and hexenyl groups on the same polymer, can be used, as can mixtures of polymers, for example a mixture of vinyl-functional and hexenyl-functional polymers.

A linear organopolysiloxane (A) containing at least 2 hexenyl groups can, e.g., contain hexenylmethylsiloxane units and/or hexenyldimethylsiloxane units. In certain embodiments, component (A) comprises, or is, a 5-hexenyldimethylsiloxane end-blocked copolymer of dimethylsiloxane units and 5-hexenylmethylsiloxane units. In certain embodiments, about 1.0 to about 4.0 wt. % or mole percent of the diorganosiloxane units of a 5-hexenyldimethylsiloxane end-blocked copolymer of dimethylsiloxane units and 5-hexenylmethylsiloxane units are 5-hexenylmethylsiloxane units.

Component (B) comprises, or is, an organopolysiloxane containing at least 2 Si—H groups per molecule. In various embodiments, component (B) contains at least 3 Si—H groups per molecule. The Si—H groups can be present in terminal dialkylhydridosilyl groups and/or in alkylhydridosiloxane groups in the organopolysiloxane chain.

In certain embodiments, component (B) has the general formula:

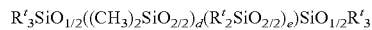

wherein each $R^t$ substituent may be an alkyl group having 1 to 4 carbon atoms or a hydrogen atom. Subscript d is 0 or an integer, and subscript e is an integer such that d+e is from 8 to 100.

In alternate or further embodiments, component (B) comprises, or is, an MQ resin consisting of units of the general formula $SiO_{4/2}$ and $R^q{}_3SiO_{1/2}$ wherein at least one $R^q$ substituent is a hydrogen atom and the remainder are alkyl groups. In further embodiments, each $R^t$ and $R^q$ substituent is a methyl group.

The H atom of Si—H groups may be present as about 0.5% to about 15 wt. % of the total Si—H and Si-alkyl groups in organopolysiloxane (B), for example about 0.8 or about 1.1 wt. % up to about 2 or about 5 wt. %. Such contents can be determined via titration.

The molar ratio of the total amount of Si—H groups in organopolysiloxane (B) to the total ethylenically unsaturated groups in organopolysiloxane (A) in the composition may be in the range of from about 0.5:1 to about 5:1, optionally from about 1.1:1 to about 2:1, or optionally from about 1.2:1 to about 2:1.

Suitable hydrosilylation catalysts (C) comprise platinum group metals (sometimes referred to as platinum metals) i.e. platinum, ruthenium, rhodium, palladium, osmium and iridium or complexes or compounds of a platinum group metal. In various embodiments, component (C) is selected from the group of platinum compounds or complexes including chloroplatinic acid, platinum acetylacetonate, complexes of platinous halides with unsaturated compounds, for example, ethylene, propylene, organovinylsiloxanes and styrene, hexamethyldiplatinum, $PtCl_2$, $PtCl_3$ and $Pt(CN)_3$. In certain embodiments, component (C) comprises Karstedt's catalyst, a coordination complex of platinum and divinyltetramethyldisiloxane produced by reaction of chloroplatinic acid and divinyltetramethyldisiloxane. In other embodiments, component (C) comprises a rhodium complex, e.g., $RhCl_3(Bu_2S)_3$.

Component (C) may be present in the composition at from about 10 to about 200 parts per million (ppm), optionally from about 30 to about 150 ppm, or optionally from about 50 or about 80 ppm up to about 120 ppm, by weight of a platinum group metal based on the total weight of the organopolysiloxane (A). In other embodiments, the aforementioned ppm ranges for component (C) are based on the total weight of components (A) and (B), or are based on the total weight of the composition.

The hydrosilylation inhibitor (D1) comprises a maleimide of the general formula (I):

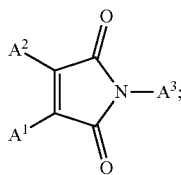
(I)

wherein $A^3$ represents a hydrogen atom or a hydrocarbyl or substituted hydrocarbyl group having 1 to 18 carbon atoms, and $A^1$ and $A^2$ each represent a hydrogen atom or a hydrocarbyl or substituted hydrocarbyl group having 1 to 18 carbon atoms. Each of the groups $A^1$, $A^2$, $A^3$ can be, e.g., hydrogen, alkyl, alkenyl, alicyclic, aryl, or aralkyl. Alkyl groups are exemplified by methyl, ethyl, propyl, butyl, tertiary butyl, pentyl, hexyl, heptyl, ethylhexyl, octyl, decyl, dodecyl, undecyl, and octadecyl. Alkenyl groups are exemplified by vinyl, allyl, propenyl, and hexenyl. Alicyclic groups are exemplified by cycloalkyl groups such as cyclopentyl and cyclohexyl, or cycloalkenyl groups such as cyclopentadienyl, cyclohexenyl, or cyclooctadienyl. Aryl groups are exemplified by phenyl, tolyl, xylyl, mesityl, and naphthyl. Aralkyl groups are exemplified by benzyl and 2-phenylethyl.

In various embodiments, each of the groups $A^1$ and $A^2$ represent a hydrogen atom but either can, e.g., be an alkyl group having 1 to 6 carbon atoms. Maleimides in which $A^1$ and $A^2$ each represent hydrogen and $A^3$ represents an alkyl group having 1 to 12 carbon atoms are generally readily compatible with the release coating composition formulation; N-alkylmaleimides in which the alkyl group has 1 to 12 carbon atoms, e.g. N-(n-propyl)maleimide or N-(t-butyl)maleimide, are thus suitable as hydrosilylation inhibitor (D1). For example, N-alkylmaleimides in which the alkyl group has 1 to 12 carbon atoms, e.g. N-(n-propyl)maleimide can be added to the composition as a liquid with no special precaution needed for the resulting coating to demonstrate good curing performance.

Component (D1), i.e. maleimide (I), can be used in the composition at a molar ratio of from about 1:1 to about 200:1, optionally from about 1:1 to about 100:1, optionally from about 5:1 to about 100:1, optionally from about 10:1 to about 100:1, optionally from about 1:1 to about 50:1, optionally from about 5:1 to about 50:1, or optionally from about 10:1 to about 50:1, maleimide (I) to platinum group metal of component (C).

Component (D2) can generally be any known hydrosilylation inhibitor other than component (D1) above. For example, the second hydrosilylation inhibitor (D2) can be selected from acetylenic compounds, e.g. acetylenic alcohols, ethylenically unsaturated isocyanates, acetylenically unsaturated silanes and unsaturated dicarboxylic acid diesters or a maleate compound such as a bismaleate or a diallylmaleate, or a mixture thereof. In certain embodiments, component (D2) is an acetylenically unsaturated compound or a maleate compound or a mixture thereof.

In various embodiments, component (D2) is selected from acetylenic compounds, such as acetylenically unsaturated alcohols. The acetylenic alcohol may be of the general formula:

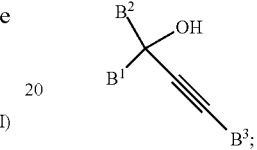

wherein $B^1$, $B^2$ and $B^3$ each represent a hydrogen atom or a hydrocarbyl or substituted hydrocarbyl group having 1 to 18 carbon atoms. For example, each of the groups $B^1$, $B^2$, $B^3$ can be hydrogen, alkyl, alkenyl, alicyclic, aryl, or aralkyl, or $B^1$ and $B^2$ can be joined to form a carbocyclic ring. Examples of acetylenic alcohols suitable as second hydrosilylation inhibitor (D2) include methyl butynol, dimethyl hexynol or 1-ethynylcyclohexanol (ETCH), depicted below.

An example of an acetylenically unsaturated silane useful as second hydrosilylation inhibitor (D2) is trimethyl(3,5-dimethyl-1-hexyn-3-oxy)silane. Examples of unsaturated dicarboxylic acid diesters include maleates, e.g. bis(2-methoxy-1-methylethyl) maleate, and fumarates, e.g. diethylfumarate or a fumarate/alcohol mixture wherein the alcohol is, for example, benzyl alcohol or 1-octanol. More than one second hydrosilylation inhibitor (D2) can be present in the release coating composition, e.g., a fumarate or maleate with an acetylenically unsaturated alcohol such as 1-ethynylcyclohexanol (ETCH), depicted below:

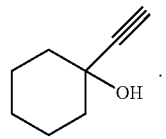

The molar ratio of the first hydrosilylation inhibitor (D1) (i.e., the maleimide of formula (I)) to the second hydrosilylation inhibitor (D2) present in the release coating composition may be from about 50:1 to about 1:50, optionally from about 10:1 to about 1:50, optionally from about 4:1 to about 1:50, optionally from about 4:1 to about 1:30, optionally from about 1:1 to about 10:1, or optionally from about 1:1 to about 4:1.

In various embodiments, the aforementioned inhibitors (D1) and (D2) are the sole hydrosilylation inhibitors in the release coating composition. In other words, the composition is free of hydrosilylation inhibitors other than components (D1) and (D2).

The inventors have found that a release coating composition comprising two inhibitors (D1) and (D2) as described herein has significantly better curing properties at lower temperatures such as from about 70° C. to about 100° C. compared to traditional hydrosilylation inhibitors (such as an acetylenically unsaturated alcohol) used in a similar coating composition as the only (or sole) inhibitor. The release coating composition comprising two inhibitors (D1) and (D2) as described herein has better curing properties compared to similar compositions comprising one individual inhibitor used in a similar coating composition. Furthermore, the introduction of the maleimide of formula (I) as inhibitor (D1) in combination with inhibitor (D2) in the release coating composition provided cured release coatings similar to prior art coatings even with lower cure temperatures.

Bulk bath life denotes, in the case of release coatings, how quickly the viscosity of the bath of the composition being coated onto substrates before cure, doubles. This is seen as an indication of the reactivity of the composition in the coating bath. If bulk bath life is too short, there is risk of gelling the coater before the proper application of the coating on substrate. It was found that bulk bath life of the coating composition was shorter when using inhibitor (D1) alone but longer bath life times were recorded when inhibitors (D1) and (D2) were both present in the coating composition.

Other constituents which may also be present in the release coating compositions of this disclosure include, e.g., silicone release modifiers, fillers, reactive diluents, adhesion promoters, solvents, fragrances and preservatives. Examples of silicone release modifiers include alkenylated silicone resins, primary alkenes containing from 12 to 30 carbon atoms, and branched alkenes containing at least 10 carbon atoms. Examples of fillers include silica, quartz and chalk.

The release coating compositions of this disclosure may be applied without solvent (solventless compositions) or in a solvent (solvent-based compositions) or as part of an oil-in-water emulsion (water-based compositions). Solventless silicone release coating compositions have some important advantages over solvent-based coating compositions: fewer environmental, health, safety, and regulatory concerns; no solvent recovery equipment required; contain no carrier that must be driven off, so line speeds can be faster; and/or less likely to damage films.

While release coating compositions of this disclosure may be prepared by merely premixing components (A), (B), (C), (D1), and (D2) together with any optional ingredients and the composition thus prepared can be applied successfully as a release coating, it may be more desired to prepare such compositions in separately packaged portions for storage and transport. In such a case the portions can be combined at the time the composition is to be applied as a coating. Usually when preparing a release coating composition in separately packaged portions or parts for storage and transport, the hydrosilylation catalyst should not be packaged with the organopolysiloxane containing Si—H groups. Many hydrosilylation inhibitors (D2), such as acetylenically unsaturated alcohols, should not be packaged with the hydrosilylation catalyst. Hence, inhibitor (D2) in a two part composition should be in a different part of the composition from the hydrosilylation catalyst (C).

The maleimide inhibitors (D1) have the advantage that, unlike many known hydrosilylation inhibitors, they are compatible with the platinum group metal hydrosilylation catalyst (C). Hence, when present in a two part composition component (D2) should be in a different part from the hydrosilylation catalyst (C) but component (D1) may be present in either or both of the 2 parts. This facilitates packaging as a 2-package composition.

One example of a packaged release coating composition according to this disclosure, which can be a 2-package system, comprises a first part comprising the organopolysiloxane (A) containing ethylenically unsaturated groups, the hydrosilylation catalyst (C) and the hydrosilylation inhibitor (D1), and a second part comprising the organopolysiloxane (B) containing Si—H groups and inhibitor (D2). The maleimide inhibitor (D1) can be added to the hydrosilylation catalyst (C) and then mixed with the organopolysiloxane (A) to form the first part, or the maleimide inhibitor (D1) can be added to the organopolysiloxane (A) followed by addition of the hydrosilylation catalyst (C).

Another example of a packaged release coating composition according to this disclosure, which can be a 2-package system, comprises a first part comprising the organopolysiloxane (A) containing ethylenically unsaturated groups and the hydrosilylation catalyst (C), and a second part comprising the organopolysiloxane (B) containing Si—H groups and hydrosilylation inhibitors (D1) and (D2).

Another example of a packaged release coating composition according to this disclosure, which can be a 3-package system, comprises a first part comprising the organopolysiloxane (A) containing ethylenically unsaturated groups and hydrosilylation inhibitor (D2) and optionally inhibitor (D1), a second part containing the hydrosilylation catalyst (C) and optionally inhibitor (D1), and a third part containing the organopolysiloxane (B) containing Si—H groups.

The release coating compositions of this disclosure can be applied to substrates such as paper and plastics, including thermally sensitive substrates such as low density polyethylene (LDPE), high density polyethylene (HDPE), polypropylene (PP), biaxially oriented polypropylene (BOPP), polyethylene coated Kraft paper (PEK), and temperature sensitive papers, using a conventional coating apparatus used for release coatings.

There is also provided a process of applying a polysiloxane release coating on the surface of a substrate. The process comprises the step of 1) coating the substrate with a curable polysiloxane release coating composition. The process further comprises the step of 2) curing the curable polysiloxane release coating composition at a temperature of from about 50° C. to about 150° C., or optionally of from about 50° C. to about 130° C., to form the release coating on the substrate. The composition is as described above, i.e., the composition comprises components (A), (B), (C), (D1), and (D2), each as described above. A cured release coating formed from and/or obtained from the composition and/or the process of this disclosure is also provided.

The release coatings thus applied can be cured at temperatures (e.g. temperature of the curing oven) in the range of from about 50° C. to about 150° C., optionally from about 50° C. to about 130° C., optionally from about 50° C. to about 100° C., or optionally from about 70° C. up to about 90° C. or about 95° C. In various embodiments, the release coatings can be applied to traditional paper substrates for curing at about 100° C. to about 150° C., or can be applied to thermally sensitive substrates for curing at about 100° C. or less, or optionally from 70° C. up to about 90° C. or about 95° C.

Dwell time (i.e. the period of time the coating is cured in the curing oven) at these temperatures can for example be in the range of from about 1 to about 50 second(s), shorter dwell times generally corresponding to higher temperatures in this range. In certain embodiments, the dwell time is from about 2 to about 30 seconds, or optionally from about 2 to about 10 seconds. The release coating compositions of this disclosure can also be cured at higher temperatures with shorter dwell times.

There is also provided a use of hydrosilylation inhibitors in a curable polysiloxane release coating composition. The inhibitors comprise components (D1) and (D2), each as described above. The composition is also as described above, i.e., the composition (further) comprises components (A), (B), and (C), each as described above.

The compositions of this disclosure are suitable, for example, for producing release, backing, and interleaving papers, for producing release, backing, and interleaving cards, films, and cloths, for treating the reverse sides of self-adhesive tapes or self-adhesive sheets or the written faces of self-adhesive labels. The compositions of this disclosure are additionally suitable for treating packing material, such as cardboard boxes, metal foils and drums, e.g., cardboard, plastic, wood or iron, which is intended for storing and/or transporting tacky goods, such as adhesives, sticky foodstuffs, e.g., cakes, honey, candies, and meat; bitumen, asphalt, greased materials, and crude rubber.

The present invention is illustrated by the following Examples, which are intended to illustrate and not to limit the invention. The components used are the following. Three alternative polymers were prepared for use in the Examples as follows.

A type (A1) polymer was prepared by mixing Q-(DM$^{vi}$)$_4$ (128.0 g) and octamethylcyclotetrasiloxane (3.30 kg), in a reaction vessel at room temperature (RT) under N$_2$ protection. The reaction mixture was heated up to 155° C. and Dow Corning Sparc Base (0.12 g) was added. After 1 hour, the reaction mixture was cooled down and neutralized with hydrogen phosphate. The reaction mixture was filtered and stripped at 231° C./0-1 torr. A light brown oil was obtained (2.9 kg, yield=85.0%). The final viscosity of the product was 296.0 mPa·s at 25° C. and it was determined that the number-averaged molecular weight was 11.9 kDa determined by multi-detector gel permeation chromatography (GPC) and the weight % of vinyl group was 0.90% (determined by titration).

A type (A2) linear dimethylhexenyl terminated dimethyl methylhexenyl copolymer was prepared. Hex(Si(CH$_3$)$_2$OSi(CH$_3$)$_2$)Hex (2.43 kg), methyl(5-hexenyl)dichlorosilane hydrolyzate (1.57 kg) and octamethylcyclotetrasiloxane (9.0 kg) were mixed well in a reaction vessel at RT under N$_2$ protection. The reaction mixture was heated up to 155° C. and Dow Corning Sparc Base (0.04 g) was added. After 1 hour, the reaction mixture was cooled down and neutralized with hydrogen phosphate. The reaction mixture was filtered and stripped at 231° C./0-1 torr. A light brown oil was obtained (6.6 kg, yield=83.0%). The final viscosity of the product was 230.0 mPa·s at 25° C. The number-averaged molecular weight was 8.3 kDa determined by multi-detector GPC and the weight % of alkenyl group was 0.90% (determined by titration).

A type (A1) polymer was prepared by mixing Q$_n$-(D$_m$M$^{hex}$)$_{2n+2}$ (0.46 kg) and octamethylcyclotetrasiloxane (7.08 kg) in a reaction vessel at RT under N$_2$ protection. The reaction mixture was heated up to 155° C. and Dow Corning Sparc Base (0.26 g) was added. After 1 hour, the reaction mixture was cooled down and neutralized with hydrogen phosphate. The reaction mixture was filtered and stripped at 231° C./0-1 torr. A light brown oil was obtained (6.23 kg, yield=82.58%). The final viscosity of the product was 708.0 mPa·s at 25° C. and it was determined that the number-averaged molecular weight was 9.4 kDa determined by multi-detector GPC and the weight % of alkenyl group was 0.93% (determined by titration).

Three organopolysiloxanes (B) were used in the Examples and are identified as follows:

(B1) is a trimethylsiloxy-terminated Dimethyl, methylhydrogen siloxane having a viscosity of 34 mPa·s at 25° C. and 1.05 mol % of Si—H groups;

(B2) is a trimethylsiloxy-terminated methylhydrogen siloxane having a viscosity of 10 mPa·s at 25° C. and 1.5 mol % of Si—H groups; and (B3) is a blend of (B1) and (B2).

The hydrosilylation catalyst (C) was Karstedt's catalyst.

The hydrosilylation inhibitor (D1) was N-(n-propyl)maleimide:

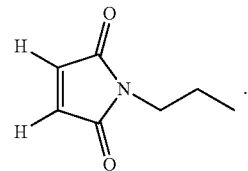

The hydrosilylation inhibitor (D2) was 1-ethynylcyclohexanol (hereafter referred to as ETCH).

Unless stated otherwise, the substrate used for all examples was a 2 MIL biaxially oriented polypropylene film (BOPP) from Innovia Films.

Coating Process:

Each release coating composition utilized in the following examples was applied and cured in the same manner, i.e. compositions were applied within 20 minutes of being mixed together on a substrate using a blade coater at room temperature (20° C.). The resulting coating was cured in the cure oven at the specified temperature for a period (dwell time) as mentioned.

The cure performance (curing speed) and adhesion of the formed coating is typically evaluated by measuring the extractable percentage (extractables %) and Rub off Resistance (ROR) value. Best properties are obtained when the extractable % is low (i.e. the closer to zero the better) and ROR is high (i.e. the closer to 100% the better).

Testing Procedure for Extractables:

To measure the cure performance of the compositions, an extractable test was undertaken immediately after cure. The extractable test was utilized to identify the amount of non-crosslinked silicone that was extractable from a cured release-coated sample in the presence of a solvent. The test method used for the following example was as follows:

Immediately upon completion of the coating process (described above) three sample discs were cut from a coated substrate using a 1.375 inch (3.49 cm) die cutter. The silicone coat weight on each sample was determined using an Oxford Instruments Lab-X 3500 Benchtop XRF analyser. Each disc was then placed in an individual 100-mL bottle containing 40 mL of methyl isobutyl ketone solvent. T tweezers were used for handling sample discs at all times to ensure that the silicone surface of the sample was not contaminated or damaged. The solvent bottles were then covered with lids and allowed to rest on the laboratory bench top for 30 minutes. After this period the discs were removed from the solvent and placed on clean tissue paper, with the silicone coated side up. The solvent was allowed to evaporate from the sample discs without wiping or blotting the samples. The final coat weight of each sample disc was then determined.

The percent of extractable was calculated using the following formula:

$$\text{Extractable \%} = \frac{(W_i - W_f)}{W_i} \times 100\%$$

where $W_i$=initial coat weight (before solvent introduction) and $W_f$=final coat weight (after solvent evaporation).
ROR Evaluations The ROR % test (sometimes referred to as anchorage index) measures the amount of cured silicone left after the coated substrate has been subjected to surface abrasion. It indicates how strong the cured coating film is anchored to the substrate; the higher the ROR % value the better. The ROR % is measured as soon as the coated substrate exits the curing oven. From each coated substrate, 2 sample discs are prepared and the silicone present in each sample disc of the coated substrate is then determined via an Oxford Instruments Lab-X 3500 Benchtop XRF analyser. Each sample disc of the coated substrate is then subjected to an abrasion test under a load of 1.9 kg and in contact with a felt using automated abrading equipment, in a manner similar to a 'Taber-type method'.

The ROR % is calculated as follows:

$$\text{ROR \%} = (W_f/W_i) \times 100$$

where $W_i$ is the initial coat weight (before abrasion) and $W_f$=final coat weight (after abrasion).
Bulk Bath Life Test:

Polymer, crosslinker and inhibitor were mixed well at RT. About 120 grams of the resulting mixture was transferred into a 250 mL glass jar with cap and the capped glass jar was heated in a 40° C. water bath for 50-60 minutes. Catalyst was then introduced into the mixture which was then mixed further. The initial viscosity was measured by Brookfield DV-II viscometer with the appropriate spindle. After 1, 2, 3 and 4 hours, the viscosity was measured accordingly. The bulk bath life was considered as the time when the viscosity of the mixture doubled as compared to the initial viscosity.

Example 1

Comparison of release coating curing performance based on ETCH, N-(n-propyl)maleimide and their combination in terms of Extractable % and ROR %.

The composition used was: polymer A(ii); organopolysiloxane (B1) in an amount such that the molar ratio of SiH:alkenyl groups in A(ii) was 2:1 mol/mol; Karstedt's (C) catalyst in an amount of 100 parts per million (ppm) by weight of platinum metal based on the total weight of the composition; and inhibitor(s) identified in Table 1 below in an amount such that there is an inhibitor(s):catalyst ratio of 70:1 (mol/mol).

Curing conditions: 85° C. for a dwell time of 4 s. Substrate: 2 MIL BOPP.

TABLE 1

| A | | | | |
|---|---|---|---|---|
| | Inhibitor(s) | | | |
| | N-(n-propyl)maleimide | | 1-ethynyl-1-cyclohexanol (ETCH) | |
| Test | Extractable % | ROR % | Extractable % | ROR % |
| 85° C./4 s | 10 | 80.17 | 31.383 | 7.93 |
| Bulk Bath life (hours) | <1 | | >4 | |

TABLE 1-continued

| B | | | | |
|---|---|---|---|---|
| | Inhibitor(s) | | | |
| | N-(n-propyl)maleimide/ ETCH = ¼ (mol/mol) | | N-(n-propyl)maleimide/ ETCH = 4/4 (mol/mol) | |
| Test | Extractable % | ROR % | Extractable % | ROR % |
| 85° C./4 s | 18.9394 | 95.20 | 13.021 | 81.39 |
| Bulk Bath life (hours) | >4 | | >4 | |

Here, the performance difference under low temperature cure conditions between the ETCH (e.g. (D2)), N-(n-propyl)maleimide (e.g. (D1)) and their combination were compared. It can be seen clearly, that when (D1) and (D2) are mixed, the presence of (D2), ETCH in the example, appears to extend bulk bath life dramatically. This time is very important to some customers who require long processing time. Also, the combined inhibitor systems demonstrated better curing performance compared with ETCH alone.

Example 2

Comparison of release coating curing performance based on between (D2) ETCH and ETCH (D2)/N-(n-propyl)maleimide (D1) combinations in terms of extractable % and ROR % results on BOPP substrate.

The composition used was: polymer A(iii); organopolysiloxane (B1) in an amount such that the molar ratio of SiH:alkenyl groups in A(iii) was 2:1 mol/mol; and Karstedt's catalyst (C) in an amount of 100 ppm by weight of platinum metal based on the total weight of the composition.

Curing conditions: 85° C. for a dwell time of 4 s; 80° C. for a dwell time of 4 s; and 75° C. for a dwell time of 7 s. Substrate: 2 MIL BOPP.

TABLE 2

| 85° C./4 s | Extractable % | ROR % |
|---|---|---|
| 0.22 wt. % ETCH | 14.7 | 51.30 |
| 0.17 wt. % ETCH/0.039 wt. % N-(n-propyl)maleimide | 5 | 100 |
| 0.21 wt. % ETCH/0.137 wt. % N-(n-propyl)maleimide | 6.8 | 97.1 |
| 0.25 wt. % ETCH/0.039 wt. % N-(n-propyl)maleimide | 5.6 | 98.6 |
| 80° C./4 s | Extractable % | ROR % |
| 0.22 wt. % ETCH | 12.2 | 64.5 |
| 0.17 wt. % ETCH/0.039 wt. % N-(n-propyl)maleimide | 6.9 | 55.5 |
| 0.21 wt. % ETCH/0.137 wt. % N-(n-propyl)maleimide | 8.3 | 88.8 |
| 0.25 wt. % ETCH/0.039 wt. % N-(n-propyl)maleimide | 8.6 | 85.1 |
| 75° C./7 s | Extractable % | ROR % |
| 0.22 wt. % ETCH | 12.8 | 83.1 |
| 0.17 wt. % ETCH/0.234 wt. % N-(n-propyl)maleimide | 9.7 | 91.7 |
| 0.21 wt. % ETCH/0.137 wt. % N-(n-propyl)maleimide | 6.5 | 97.3 |
| 0.25 wt. % ETCH/0.039 wt. % N-(n-propyl)maleimide | 5.5 | 99.3 |

In each instance, the compositions solely using ETCH (e.g. (D2)) as inhibitor were inferior to those using combined inhibitors (D1) and (D2). It was found that in all these compositions, the bulk bath life was >4 hours.

Example 3

Comparison of release coating curing performance based on between ETCH (e.g. (D2)) and ETCH/N-(n-propyl)maleimide (D2) & (e.g. (D1)) combination systems in terms of extractable % and ROR % on a PEK paper substrate.

The composition used was: polymer A(iii); organopolysiloxane (B2) in an amount such that the molar ratio of SiH:alkenyl groups in A(iii) was 2:1 mol/mol; and Karstedt's catalyst (C) in an amount of 100 ppm by weight of platinum metal based on the total weight of the composition.

Curing conditions: 91° C. Dwell time: 3 s. Substrate: PEK paper substrate.

TABLE 3

| Composition | Extractable % | ROR % |
|---|---|---|
| ETCH (0.22%) | 12.0 | 41.1 |
| N-(n-propyl)maleimide/ETCH (0.039%/0.17% w/w) | 5.8 | 90.8 |

Example 4

Release coating curing performance based on ETCH/N-(n-propyl)maleimide combination systems in terms of extractable % and ROR % on a polypropylene substrate.

The composition used was: polymer A(iii); organopolysiloxane (B2) in an amount such that the molar ratio of SiH:alkenyl groups in A(iii) was 2:1 mol/mol; Karstedt's catalyst (C) in an amount of 100 ppm by weight of platinum metal based on the total weight of the organopolysiloxane (A) and organopolysiloxane (B); and the inhibitors were present in a weight ratio of (D2):(D1) of 0.81:0.13 w/w.

Curing conditions: 91° C. Dwell time: 4 s or 7 s. Substrate: polypropylene.

TABLE 4

| Curing Conditions | Extractable % | ROR % |
|---|---|---|
| 90° C./7 s | 2.19 | 99.4 |
| 90° C./4 s | 3.06 | 99.2 |

Table 4 above demonstrates the inhibitor combination works well on polypropylene substrates at low temperature cure condition.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a ">" is "at least" or "greater-than or equal to"; a "<" is "below" or "less-than"; and a "5" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation.

Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A curable polysiloxane release coating composition, the composition comprising:
   (A) an organopolysiloxane containing at least two (2) ethylenically unsaturated groups;
   (B) an organopolysiloxane containing at least 2 Si—H groups per molecule, provided that if the organopolysiloxane (A) contains only 2 ethylenically unsaturated groups the organopolysiloxane (B) contains on average more than 2 Si—H groups per molecule;
   (C) a hydrosilylation catalyst comprising a platinum group metal or a complex or compound of a platinum group metal;
   (D1) a hydrosilylation inhibitor comprising N-(n-propyl) maleimide; and
   (D2) a second hydrosilylation inhibitor comprising 1-ethynylcyclohexanol;
   wherein the release coating composition is solventless.

2. The release coating composition according to claim 1, wherein the N-(n-propyl)maleimide is present at a molar ratio of from about 1:1 to about 100:1 with respect to the platinum group metal of the hydrosilylation catalyst (C).

3. The release coating composition according to claim 1, wherein the molar ratio of the hydrosilylation inhibitor (D1) to the second hydrosilylation inhibitor (D2) present in the release coating composition is from about 10:1 to about 1:50.

4. The release coating composition according to claim 1, wherein the organopolysiloxane (A) comprises a branched organopolysiloxane having at least three (3) organopolysiloxane branch chains linked through a central core, and includes at least 3 organopolysiloxane branch chains each of which contains an ethylenically unsaturated group.

5. The release coating composition according to claim 4, wherein the branched organopolysiloxane (A) is terminated by units of the formula $R^a R^b_2 SiO_{1/2}$ and comprises one or more units of the formula $SiO_{4/2}$ or of the formula $R^c SiO_{3/2}$ and 15 to 995 units of the formula $R^b_2 SiO_{2/2}$, wherein each $R^a$ substituent is selected from an alkyl group having 1 to 6 carbon atoms and an ethylenically unsaturated alkenyl group having 2 to 6 carbon atoms, at least 3 $R^a$ substituents in the branched organopolysiloxane (A) being ethylenically unsaturated alkenyl groups, each $R^b$ substituent is an alkyl group having 1 to 6 carbon atoms or an aryl group, and each $R^c$ substituent is selected from an alkyl group having 1 to 6 carbon atoms, an ethylenically unsaturated alkenyl group having 2 to 6 carbon atoms, an aryl group or an alkoxy group having 1 to 6 carbon atoms.

6. The release coating composition according to claim 1, wherein the organopolysiloxane (A) comprises an organopolysiloxane containing at least 2 hexenyl groups.

7. The release coating composition according to claim 1, wherein component (A) has a viscosity of from about 50 to about 1000 mPa s at 25° C.

8. The release coating composition according to claim 1, wherein the molar ratio of the hydrosilylation inhibitor (D1) to the second hydrosilylation inhibitor (D2) present in the release coating composition is from about 1:1 to about 1:10.

9. The release coating composition according to claim 1, capable of curing on a substrate to give a release coating at a temperature of from about 50° C. to about 130° C. and a dwell time of about 1 to about 50 second(s).

10. The release coating composition according to claim 1, capable of curing on a substrate to give a release coating at a temperature of from about 70° C. to about 75° C. and a dwell time of about 2 to about 30 second(s).

11. The release coating composition according to claim 1, capable of curing on a substrate to give a release coating at a temperature of from about 70° C. to about 75° C. and a dwell time of about 2 to about 10 second(s).

12. The release coating composition according to claim 1, wherein the N-(n-propyl)maleimide is present at a molar ratio of from about 1:1 to about 100:1 with respect to the platinum group metal of the hydrosilylation catalyst (C), and wherein the molar ratio of the hydrosilylation inhibitor (D1) to the second hydrosilylation inhibitor (D2) present in the release coating composition is from about 1:1 to about 1:10.

13. The release coating composition according to claim 1, wherein component (D1) is N-(n-propyl)maleimide, and wherein component (D2) is 1-ethynylcyclohexanol.

14. A process of applying a polysiloxane release coating on the surface of a substrate, the process comprising the steps of:
   1) Coating the substrate with a curable polysiloxane release coating composition, wherein the composition comprises:
      (A) an organopolysiloxane containing at least 2 ethylenically unsaturated groups;
      (B) an organopolysiloxane containing at least 2 Si—H groups per molecule, provided that if the organopolysiloxane (A) contains only 2 ethylenically unsaturated groups the organopolysiloxane (B) contains on average more than 2 Si—H groups per molecule;
      (C) a hydrosilylation catalyst comprising a platinum group metal or a complex or compound of a platinum group metal;
      (D1) a hydrosilylation inhibitor comprising N-(n-propyl)maleimide; and
      D2) a second hydrosilylation inhibitor comprising 1-ethynylcyclohexanol; and
   2) curing the curable polysiloxane release coating composition at a temperature of from about 50° C. to about 150° C. to form the release coating on the substrate;
   wherein the curable polysiloxane release coating composition is solventless.

15. The process according to claim 14, wherein the composition is cured at a temperature of from about 50° C. to about 130° C.

16. The process according to claim 14, wherein the composition is cured during a dwell time of from about 1 to about 50 second(s).

* * * * *